Jan. 30, 1962  R. G. ROWE  3,019,387
METHOD AND APPARATUS FOR DAMPED WAVE ANALYSIS
Filed Jan. 11, 1960

INVENTOR
Robert G. Rowe

United States Patent Office 3,019,387
Patented Jan. 30, 1962

3,019,387
METHOD AND APPARATUS FOR DAMPED
WAVE ANALYSIS
Robert G. Rowe, 8237 Witkop Ave., Niagara Falls, N.Y.
Filed Jan. 11, 1960, Ser. No. 1,734
4 Claims. (Cl. 324—68)

This invention relates to devices for measuring the character of damped waves and, in particular, to a novel and improved method and apparatus for measuring and comparing the logarithmic decrement or damping factor of electric waves or mechanical vibrations.

In one prior art apparatus described by Pattison, "An Apparatus for the Accurate Measurement of Internal Friction," The Review of Scientific Instruments, volume 25, 1954, page 490, the damped wave to be investigated is rectified to produce uni-directional half-waves of logarithmically decaying amplitude. The waves are filtered in a conventional resistance-capacitance filter to produce a logarithmically decaying direct current voltage. Subsequent trigger and gate circuits are arranged to start an electronic counter when the aforementioned decaying D.C. voltage reaches a first predetermined amplitude and to stop the counter when the decaying voltage has reached a second predetermined amplitude. As the counter and circuitry is arranged to count the oscillations of the damped wave, the number of cycles of the damped wave occurring between two predetermined amplitudes is counted and displayed on the electronic counter as a relative measure of the logarithmic decrement or damping factor of the wave under investigation.

The apparatus of the cited reference is employed to study damped waves with frequencies approximating 10,000 cycles per second. A disadvantage of the method and apparatus becomes apparent as the frequency of the damped wave is reduced, or as the logarithmic decrement becomes greater.

As the frequency is reduced, or as the logarithmic decrement becomes greater, half-wave ripple modulation superimposed on the logarithmically decaying D.C. voltage spuriously operates the trigger and gate circuits and introduces an increasing error in the indicated count. This occurs because the gate opening interval, determined by the preset amplitude levels, becomes erratic due to the ripple modulation. This error limits the usefulness and accuracy of the method and apparatus when damped waves with low frequencies or large decrements are employed.

To those versed in the art it will be apparent that the ripple modulation may be reduced by increasing the time constant of the resistance-capacitance filter network. However, there is a unique limitation to increasing the time constant of the filter. If the filter time constant is too long, then the decaying D.C. voltage no longer is representative only of the damped wave under measurement, but becomes a complex composite of the damped wave characteristics and the energy storage capabilities of the filter.

An additional modification to reduce the amplitude of the ripple modulation is to employ full-wave, rather than half-wave rectification of the damped wave signal. However, for a number of applications involving low frequencies and high damping factors, I have found it impossible to eliminate the effects of ripple modulation by full-wave rectification and filter time constants alone.

Therefore, an object of the present invention is to provide a method and apparatus for improving the accuracy, stability and reproducability of the measurement or evaluation of logarithmic decrement in damped waves.

Another object of the present invention is to provide a method and apparatus for the accurate measurement or evaluation of damped waves with low frequencies and high damping factors.

Still another object of the present invention is to reduce the ripple modulation on a logarithmically decaying D.C. voltage produced by rectifying and filtering a damped electrical wave.

A further object of the present invention is to reduce the time constant of resistance-capacitance or inductance-capacitance filter networks in logarithmic decrement apparatus of the type described.

These objects and other objects ancillary thereto I prefer to accomplish in short by producing phase-displaced waves from the damped wave and rectifying and filtering the multiple phase-displaced waves to produce a substantially ripple-free logarithmically decaying D.C. voltage representative of the damped wave under observation.

The novel features which I believe to be characteristic of my invention are engendered with particularity in the appended claims; the invention itself, however, will be best understood by reference to the accompanying detailed description and drawings, in which FIGURE 1 illustrates a damped wave.

Figure 6:
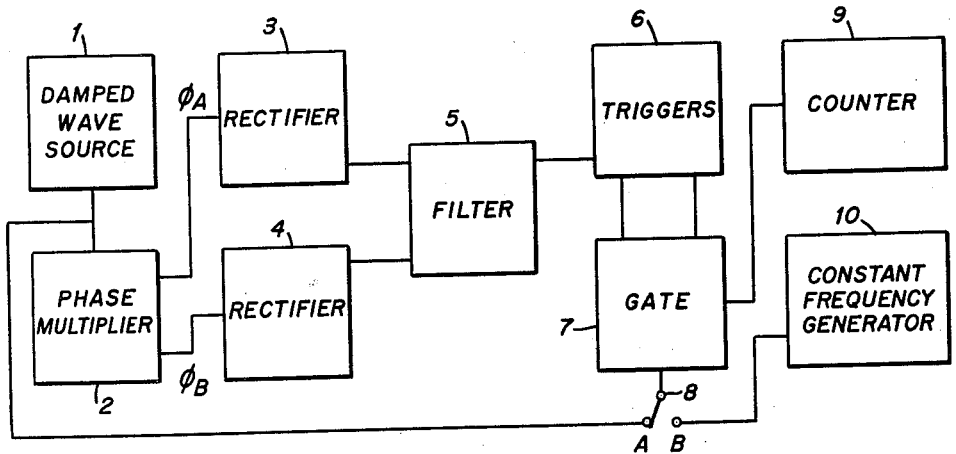

FIGURE 6 diagrammatically illustrates a preferred embodiment of the present invention.

Figure 1:
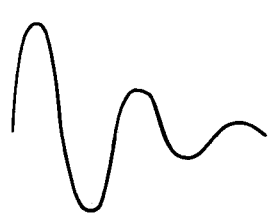

With reference to the drawings, FIGURE 1 illustrates a damped wave of voltage or current, decaying or changing in amplitude logarithmically. When such a wave is half-wave rectified and filtered, the ripple modulation superimposed on the logarithmically decaying D.C. voltage at the filter will exhibit a frequency equal to the frequency of the damped wave.

Figure 2:
FIGURE 2 illustrates a damped wave which has been full-wave rectified.
Figure 3:
FIGURE 3 illustrates a damped wave which has been full-wave rectified and filtered.

FIGURE 2 illustrates the same damped wave, full-wave rectified, and FIGURE 3 the same damped wave full-wave rectified and filtered with a typical resistance-capacitance, RC, filter. It will be noted that in this case the ripple frequency is twice the frequency of the damped wave.

Figure 4:
FIGURE 4 illustrates two damped waves, phase-displaced by 90 degrees and full-wave rectified.
Figure 5:
FIGURE 5 illustrates two damped waves, phase-displaced by 90 degrees, full-wave rectified and filtered.

FIGURE 4 illustrates two damped waves, $\phi_a$ and $\phi_b$, produced from the same damped wave but displaced in phase from one another by 90 degrees and full-wave rectified. It will be noted that the voltage minima of wave $\phi_a$ are filled in by voltage maxima of wave $\phi_b$. When each wave is full-wave rectified and combined in a common RC filter network, the ripple frequency becomes four times the frequency of the original damped wave and the amplitude of the ripple drastically is reduced, as shown in FIGURE 5.

Not only is the amplitude of the ripple voltage, or modulation, reduced, but, for the same level of permissible ripple, filters with much shorter time constants may be employed to smooth out the ripple. I have found that systems similar to those of the cited reference can be devised for evaluating the logarithmic decrement of highly damped waves or low-frequency damped waves, with the error caused by ripple modulation being reduced to negligible proportions.

With reference to FIGURE 6, I have set forth what I consider to be a novel and useful assembly of known circuit elements to accomplish those objectives hereinbefore recited. Shown in FIGURE 6 is a source 1 of damped waves, which may be produced by techniques old in the art from shock-excited resonant electrical circuits or from the decaying mechanical vibrations of solid bodies. For example, source 1 may be the damped wave voltage output of a piezoelectric transducer coupled to a mechanical body undergoing logarithmically decaying vibration.

Damped wave source 1 is connected to phase multiplier 2. Circuit arrangements to produce, from a single alternating voltage, two alternating voltages differing in phase by 90 degrees are known in the art. If the single alternating voltage is a single, constant frequency, relatively simple resistance-capacitance bridges may be employed. However, in the case of apparatus to evaluate the decay characteristics of damped waves, and in the interest of instrument versatility, such apparatus must accommodate a wide range of frequencies.

For these reasons it is preferred that phase multiplier 2 be designed to produce two output voltages differing in phase by 90 degrees over a wide band of frequencies. Such circuits are shown by Dome, "Wideband Phase Shift Networks," Electronics, December 1946, page 112, for example.

Phase multiplier 2 produces two voltages identified as $\phi_a$ and $\phi_b$, differing in phase by 90 degrees, and connected to full-wave rectifiers 3 and 4 respectively. The full-wave rectified A.C. outputs of rectifiers 3 and 4 are combined in resistance-capacitance, RC, or inductance-capacitance, LC, filter 5. The energy storage elements of filter 5 are chosen to provide a time constant sufficiently long to produce from the original damped wave signal a logarithmically decaying D.C. voltage effectively free from objectionable ripple. Energy storage elements of filter 5 further are chosen to provide a time constant sufficiently short that the logarithmically decaying character of the damped wave under evaluation is not vitiated.

The logarithmically decaying or changing voltage from filter 5 is connected to triggers 6, which may be similar to those employed by Fusfeld in "Apparatus for Rapid Measurement of Internal Friction," The Review of Scientific Instruments, volume 21, 1950, page 615. Such triggers will provide a first pulse when the voltage from filter 5 has decayed to a first predetermined amplitude level and a second pulse when the voltage has decayed to a second predetermined level.

Trigger signals from triggers 6 are connected to normally-closed gate 7 in a manner known in the art. Upon receipt of a first pulse from triggers 6, gate 7 will open and pass signals from switch terminal 8 to electronic decade counter 9. Upon receipt of a second pulse from triggers 6, gate 7 will close and interrupt signals from switch terminal 8 to counter 8. Switch 8 enables two separate modes of operation for the overall system. With switch 8 in position "A," the number of cycles of oscillation of damped wave source 1 occurring between two predetermined damped-wave amplitudes are counted. With switch 8 in position "B," the number of cycles of oscillation of constant frequency generator 10 occurring between two predetermined damped-wave amplitudes are counted. In this latter mode of operation, gate 7, counter 9 and constant frequency generator 10 cooperate to function as an electronic chronometer, which measures the time required for the damped-wave signal to decay from a first to a second predetermined amplitude.

For the evaluation of logarithmic decrement or damping factor in damped waves, the beneficial results of producing two phase-displaced voltages differing by 90 degrees may be further extended. I have found that these two-phase voltages produced by the elements in the present invention may be employed to produce three-phase voltages differing in phase by 120 degrees by employing the Scott-connected transformer, known in the art. In the present apparatus the two-phase output of phase multiplier 2 may be transformed by the Scott-connected transformer to a three-phase output. Full-wave rectification of the three-phase output voltages will produce a ripple frequency which is six times that of the original damped-wave input. As the ripple modulation frequency thereby is increased, filters with even shorter time constants may be employed to smooth the logarithmically decaying D.C. voltage resulting from the logarithmically decaying damped wave.

While I have shown and described in detail one preferred embodiment of my invention, I am aware that various changes and modifications may occur to those versed in the art without departing from the invention. Therefore, it is aimed in the appended claims to cover any and all changes and modifications which fall within the true spirit and scope of the invention.

I claim:

1. An apparatus for evaluating the damping factor of an electric oscillating damped wave comprising, in combination, a source of said damped waves, phase multiplication means connected to said source of damped waves and arranged to produce a number of phase-displaced damped waves, rectifier means connected to said phase multiplication means and arranged to produce pulsating D.C. voltage from each phase-displaced damped wave, filter means connected to said rectifier means to combine and smooth said pulsating D.C. voltage and measuring means connected to said filter means and arranged to indicate the time required for said D.C. voltage to change from a first to a second predetermined level.

2. An apparatus for evaluating the damping factor of an electric oscillating damped wave comprising, in combination, a source of said damped waves, phase multiplication means connected to said source of damped waves and arranged to produce a number of phase-displaced damped waves, rectifier means connected to said phase-multiplication means and arranged to produce pulsating D.C. voltage from each phase-displaced damped wave, filter means connected to said rectifier means to combine and smooth said pulsating D.C. voltage and measuring means connected to said filter means and arranged to indicate the number of oscillations of said damped wave occurring during the time interval required for said D.C. voltage to change from a first to a second predetermined amplitude level.

3. A chronometer to measure the time required for a damped wave to decay from a first to a second amplitude level, comprising, in combination, a source of damped wave signals, phase multiplying means connected to said source of damped wave signals for producing a multiplicity of signals shifted in phase with respect to each other, signal rectifier means connected to each phase shifting means for producing rectified alternating currents therefrom, circuit means for interconnecting the outputs of said rectifiers for combining the rectified alternating current outputs from each signal rectifier, filter means connected to reduce the ripple voltage on the combined rectifier outputs, and means, connected to said filter means, to start a time interval meter when the rectified and filtered damped wave signals reach a first predetermined amplitude and to stop said meter when said signals reach a second predetermined amplitude.

4. In an apparatus for evaluating the damping factor of the damped mechanical vibrations of a physical body, which includes in part said body and transducer means connected to said body to produce an electric oscillating damped wave from the damped mechanical vibrations of the body, the improvement which includes phase multiplication means connected to said transducer and arranged to produce a number of phase-displaced waves, rectifier means connected to said phase-multiplication means and arranged to produce pulsating D.C. voltage from each phase-displaced damped wave, filter means connected to said rectifier means to combine and smooth said pulsating D.C. voltage and measuring means connected to said filter means and arranged to indicate the time required for said D.C. voltage to change from a first to a second predetermined level.

References Cited in the file of this patent
UNITED STATES PATENTS

| | | |
|---|---|---|
| 2,762,008 | Gordon | Sept. 4, 1956 |
| 2,832,044 | Bliss | Apr. 22, 1958 |
| 2,863,116 | Olsson et al. | Dec. 2, 1958 |
| 2,924,777 | Liu et al. | Feb. 9, 1960 |